Oct. 16, 1951        L. GENETY        2,571,561
HYDRAULIC TRANSMISSION
Filed Dec. 3, 1948        3 Sheets-Sheet 3
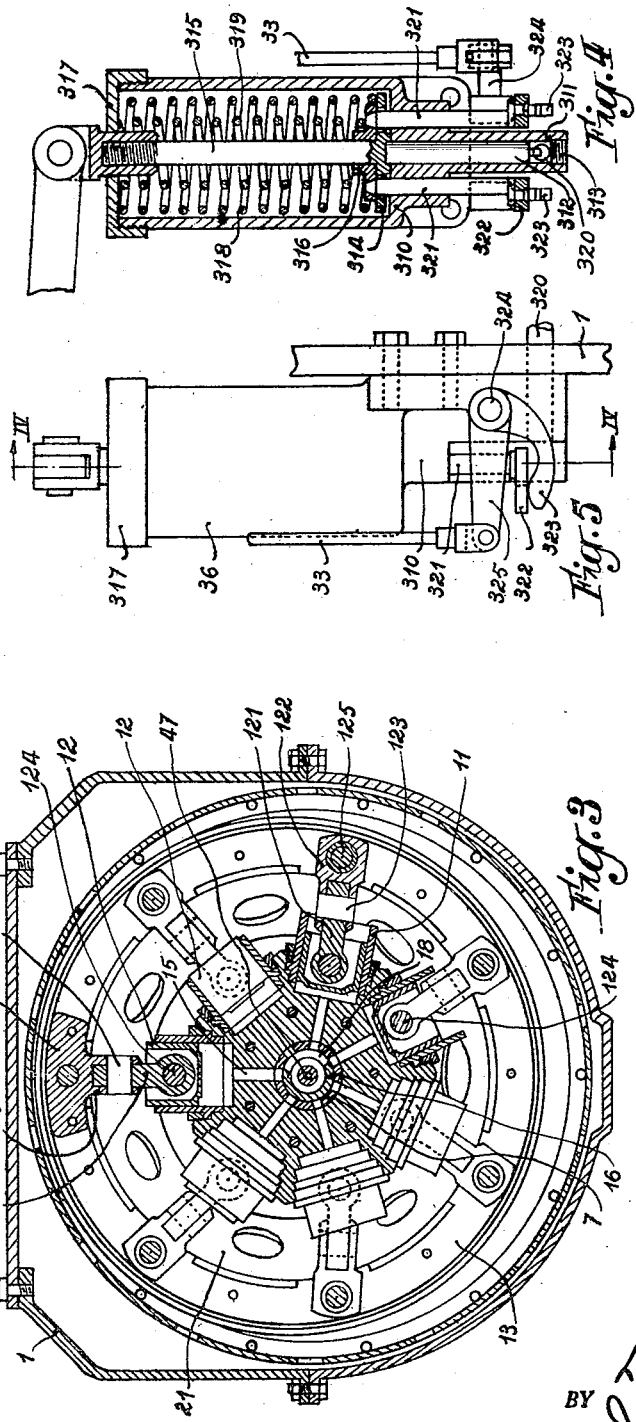

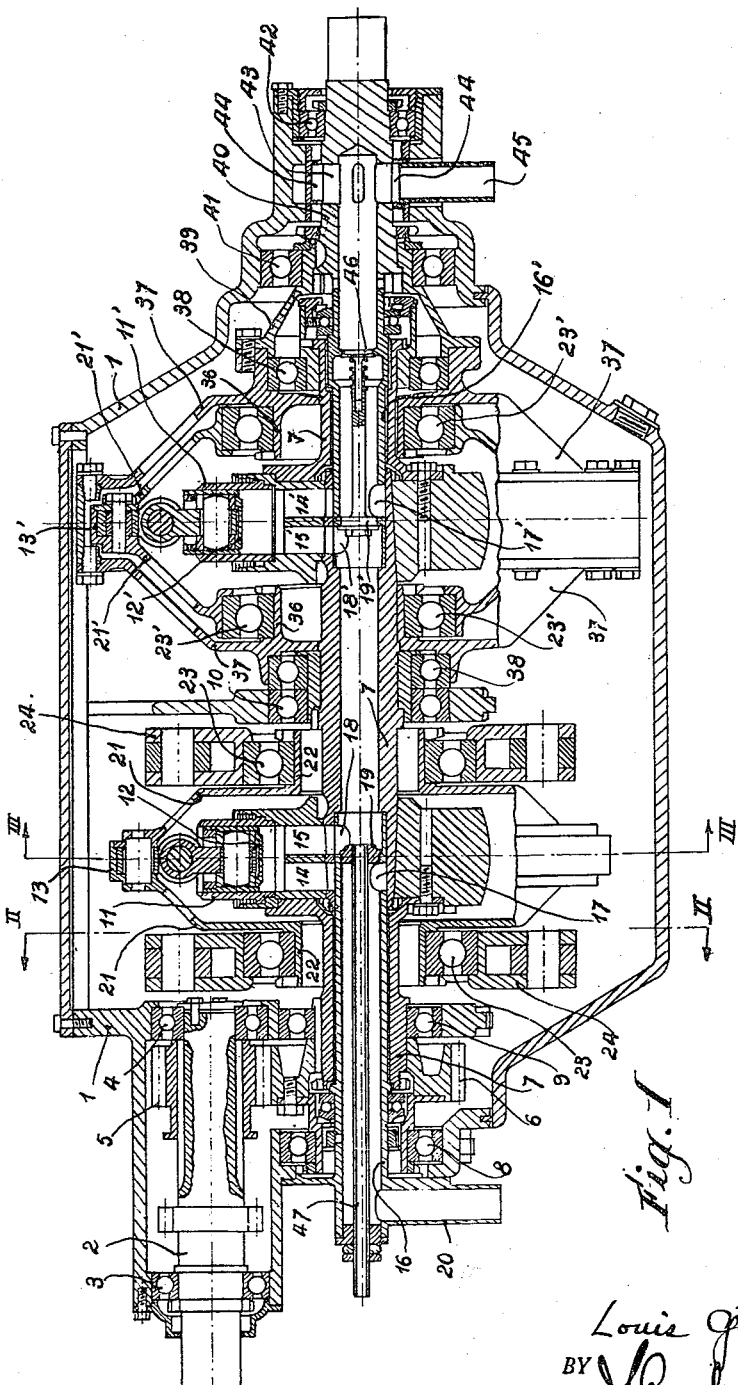

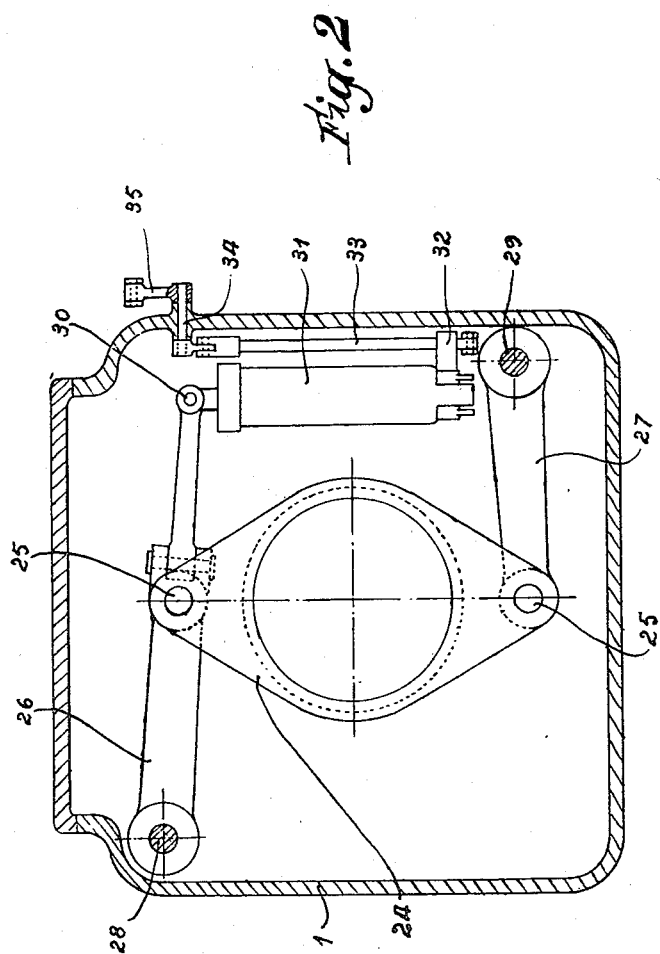

Patented Oct. 16, 1951

2,571,561

UNITED STATES PATENT OFFICE 2,571,561

HYDRAULIC TRANSMISSION

Louis Genety, Lyon, France

Application December 3, 1948, Serial No. 63,341
In France August 9, 1948

3 Claims. (Cl. 60—53)

My invention relates to variable hydraulic power transmissions of the kind wherein the driven shaft is connected with the driving shaft through a rotary hydraulic pump associated with a rotary hydraulic motor in such a manner that the speed difference (slip) between the two shafts is transformed into an additional torque on the transmission gear, control of the transmission ratio being effected by varying the eccentricity of the fixed element of the hydraulic motor. A hydraulic gear of this kind is described in my co-pending U. S. patent application Ser. No. 710,885 filed November 19, 1946.

A first object of my invention is to provide a hydraulic transmission of the kind above referred to wherein the oil will be circulated throughout the apparatus always in the same direction thus avoiding the formation of stagnant oil masses which become hot and give rise to foam impairing the efficiency of the gear.

Another object of my invention is a hydraulic transmission embodying radial rotary cylinders, wherein there is provided for each cylinder separate inlet and outlet canals to connect the cylinder to the corresponding distributor.

Still a further object of my invention is a hydraulic transmission of the type above defined, wherein the radial rotary cylinders of each cylinder block open outwardly, their respective pistons cooperating with an outer annular rotating member disposed in eccentric relation with respect to the axis of the cylinder block. In the case of the pump this outer member is eccentrically and rotatably carried by a casing keyed to the driving shaft, while in the case of the motor it is rotatably carried by a transversely movable support whereby its eccentricity may be varied at will, the said support being guided by two opposed pivoted arms.

In the annexed drawings:

Fig. 1 is a longitudinal section of a transmission gear established in accordance with my invention.

Fig. 2 is a diagrammatical cross-section thereof through line II—II of Fig. 1.

Fig. 3 is another cross-section taken through line III—III of Fig. 1.

Fig. 4 is an enlarged longitudinal section taken through line IV—IV of Fig. 5 of the controlling hydraulic cylinder device.

Fig. 5 is a side view of same.

The apparatus comprises a casing 1 (Fig. 1) enclosing a relatively short inlet shaft 2 carried by bearings 3 and 4 and supporting a pinion 5. Pinion 5 meshes with a hollow shaft formed of a number of successive parts appropriately assembled together, the said shaft being generally referenced 7. Shaft 7 is rotatably carried by bearings 8, 9 and 10.

Shaft 7 carries two rows of outwardly opening radial cylinders 11 and 11' which are secured thereto and rotate therewith, cylinders 11 corresponding to the hydraulic motor and cylinders 11' to the hydraulic pump. The corresponding pistons 12 and 12' are respectively connected to annular members 13 and 13' which are adapted to rotate about a geometrical axis different from the axis of shaft 7, as hereinafter described.

Each cylinder 11 or 11' communicates with the inner bore of shaft 7 through two short radial canals, respectively 14—15 and 14'—15'.

Into the left end of shaft 7 there is engaged a fixed hollow shaft 16 and in the cylindrical wall of this shaft there is provided a pair of openings 17 and 18 adapted to form distributing ports in relation to canals 14 and 15 respectively (Figs. 1 and 3). For this purpose shaft 16 fits tightly but rotatably in shaft 7 and there is provided an intermediate transverse partition 19 in the bore of shaft 16 between openings or ports 17 and 18.

Shaft 16 projects from casing 1 at the left side thereof (Fig. 1). Its outer end is closed but there is provided a lateral nozzle 20 adapted to be connected to a discharge line, as explained below.

Member 13 is carried by cheeks 21 integral with annular hubs 22 carried by ball bearings 23, the latter being in turn supported by supports 24. Each support 24 (Figs. 1 and 2) is formed with a pair of opposed lugs which are pivoted at 25 to arms 26 and 27 disposed in substantially parallel but opposed relation. Both arms 26 are keyed on a longitudinal shaft 28 rotatably carried by casing 1, while in the same manner both arms 27 are keyed on a longitudinal shaft 29 also rotatable within casing 1. One arm 26 extends beyond the corresponding pivot 25 and it is pivotally connected at 30 with the movable rod of a hydraulic cylinder device 31 enclosing a returning spring in such a manner as to form a pressure-responsive apparatus.

As indicated in Figs. 4 and 5 the above-mentioned device 31 comprises a cylindrical casing generally referenced 31 provided with a base 310 having a vertical axial bore 311 enclosing a slidable rod 312 and closed at its lower end by a screw 313. Casing 31 houses a circular plate 314 formed with a rod 315 which is articulated at 30 with the corresponding arm 26, as above explained. Another plate 316 is slidable on rod 315.

And between each plate 314 and 316 and the cover 317 of casing 31 there is interposed a coil spring 318 and 319, springs 318 and 319 being arranged in co-axial relation as shown.

It will be understood that when oil under pressure is forced into bore 311 (by a pipe 320, Fig. 5), rod 312 is displaced upwardly and moves plates 314 and 316 against springs 318 and 319.

A pair of vertical rods 321 is slidably passed through base 310 each side of bore 311. Each rod 321 is passed through plate 314 and terminates into a conical upper end which fits into a conical hole of plate 316. The lower end of each rod 321 is formed with a shoe 322 which is pressed upwardly by an arcuate lever 323, both levers 323 being keyed on the same transverse shaft 324 rotatably carried by base 310. Shaft 324 carries an arm 325 which may be actuated by a rod 33 (Fig. 2) pivoted to an arm of a shaft 34 rotatable through casing 1. Shaft 34 is in turn actuated by an arm 35 exterior to casing 1.

It will be understood that actuation of arm 35 will result in an upward movement of plate 316 against the action of spring 319, whereby the first part of the upward movement of rod 312 will be effected against the action of spring 318 only, until plate 314 meets plate 316 when both springs 318 and 319 will be effective against the action of oil pressure on rod 312.

Referring now to Fig. 2, it will be seen that the center of the line connecting pivots 25 moves along a path which is substantially a straight line for small angles of oscillation of levers 26—27 (this path is actually a closed curve in the shape of the cipher 8, with inversion of the curvature in the central zone). It may therefore be assumed that under the action of device 31 the geometrical axis of rotation of cheeks 21 moves in the plane of Fig. 1.

It will be noted that the connection between pistons 12 and member 13 is effected through connecting rods in two parts 121 and 122 (Fig. 3) articulated to each other at 123 at right angles with respect to the articulations 124 and 125 to the corresponding piston 12 and to member 13. One of these double connecting rods is rigidly secured to member 13, as indicated at 126, to ensure proper rotation of the latter.

The arrangement of the pump is similar to that of the motor. The cheeks 21' (Fig. 1) carrying the outer member 13' rotate on ball bearings 23' carried by hubs 36 which are eccentrically supported by a box-like assembly 37 enclosing cheeks 21'. This member 37 is supported by ball bearings 38 carried by shaft 7 and it extends towards the right in the form of a cap 39 formed integral with the outlet shaft 40 of the transmission, the said shaft being carried by ball bearings 41 and 42.

Shaft 40 has a blind axial bore opening to the left and this bore communicates by radial canals 43 with an annular chamber 44 formed in casing 1 and connected to a liquid inlet line 45.

The left end of shaft 40 is engaged into the axial bore of shaft 7 and it plays with respect to the pump the role of shaft 16 with respect to the motor. This portion of shaft 40 has therefore been referenced 16', its ports 17' and 18' and the intermediate partition between same 19'.

A non-return valve 46 is disposed in the axial bore of shaft 40.

Outlet 20 discharges into an open oil reservoir in which opens a suction tube connected to inlet 45.

The operation is as follows:

When shaft 2 is rotated, shaft 7 is driven through gears 5 and 6 and it rotates together with cylinders 11 and 11'. If some resisting torque is applied to shaft 40, the latter tends to remain immovable, the two parts of the pump (cylinders 11' and box-like casing 37) thus rotating with respect to each other, oil being drawn in from the open reservoir through line 45, valve 46 and port 17', and being forced into shaft 7, through port 18'.

Assuming that the motor is at zero eccentricity (hubs 22 co-axial to shaft 7), no oil can pass through the latter since the stroke of the pistons thereof is then zero. The pump is blocked and it is constrained to rotate as a rigid assembly. The transmission ratio is 1 to 1.

If now the motor is adjusted at a given eccentricity, for each revolution of shaft 7 a given quantity of oil may pass from the axial bore of shaft 7 to the outlet or discharge 20 through port 18, the successive motor cylinders 11, port 17 and shaft 16. Consequently the two parts of the pump may rotate with respect to each other through a given angle for each revolution of shaft 2 and there appears a speed difference (slip) between shafts 7 and 40. For each eccentricity of hubs 22 this slip is exactly determined, since the pump cannot discharge more oil than the motor can admit, and the loss of power corresponding to this reduction in speed is compensated by an increase in torque resulting from the addition on shaft 7 of the torque developed by the motor to the torque transmitted by gears 5 and 6.

An axial tube 47 is passed through partition 19 and it extends to the left to be connected with the above-mentioned inlet pipe 320 of the hydraulic cylinder device 31 of Figs. 2, 4 and 5. In this manner when the torque transmitted from shaft 7 to shaft 40 increases, the oil pressure causes an increase in the eccentricity of hubs 22, thereby increasing the slip. This automatic control of the transmission ratio may be adjusted at will by arm 35, as above explained with reference to Figs. 4 and 5.

When my hydraulic transmission is applied to a vehicle or in similar cases, reversal of the transmission of power is liable to occur, the engine being driven by the vehicle wheels. In such a case valve 46 closes, thereby preventing reversal of operation of the pump which would otherwise suck oil from shaft 7 and act as a vacuum pump. The pump is thus blocked and the transmission operates with 1 to 1 ratio.

It will be understood that owing to the provision of two canals 14—15 for each cylinder, there is no portion of the oil which does not circulate between a cylinder and the corresponding ports, whereas in the known hydraulic transmissions with variable eccentricity at reduced eccentricities the oil present in the canals connecting the cylinders to the distributor does not circulate continuously but reciprocates and becomes hot, which gives rise to formation of foam by development of gases.

I claim:

1. A hydraulic transmission gear comprising a rotatable tubular shaft adapted to receive the torque to be transmitted; a set of outwardly opening radial motor cylinders carried by said tubular shaft; a pair of canals to connect each of said motor cylinders to an inlet and an outlet port formed in the bore of said rotatable tubular shaft; a fixed tubular shaft engaged into one end of said rotatable tubular shaft, said fixed tubular shaft being formed with openings adapted to cooperate with said ports to form therewith a hydraulic distributor for said motor cylinders, said openings being separated by a transverse partition, and said fixed tubular shaft being adapted for connection with a liquid discharge line; motor pistons in said motor cylinders; an annular member surrounding said motor cylinders; means to rotatably support said annular member at a variable eccentricity with respect to said rotatable tubular shaft; connecting rods to connect each of said motor pistons with said annular member; a set of outwardly opening radial pump cylinders also carried by said rotatable tubular shaft at the end thereof opposed to said fixed tubular shaft; a pair of canals to connect each of said pump cylinders to an inlet and an outlet port formed in the bore of said rotatable tubular shaft; a second rotatable tubular shaft in line with said first rotatable tubular shaft and having its end engaged into the end of said first rotatable tubular shaft opposed to said fixed tubular shaft, said second rotatable tubular shaft being formed with openings adapted to cooperate with said last-named ports to form therewith a hydraulic distributor for said pump cylinders, said last-named openings being separated from each other by a transverse partition, and said second rotatable tubular shaft being adapted for connection with a liquid inlet line; pump pistons in said pump cylinders; a rotatable casing enclosing said pump cylinders, said casing being co-axial to said second rotatable tubular shaft and connected thereto to rotate therewith; an annular member surrounding said pump cylinders within said casing; means to rotatably support said last-named annular member on said casing in eccentric relation thereto; and connecting rods to connect each of said pump pistons with said last-named annular member.

2. A hydraulic transmission gear comprising a first rotatable shaft adapted to receive the torque to be transmitted; a second rotatable shaft in line with said first rotatable shaft; hydraulic pump means for torque transmission from said first rotatable shaft to said second rotatable shaft while permitting a speed difference between both; outwardly opening motor cylinders radially carried by said first rotatable shaft; pistons in said motor cylinders; means to connect said pistons with an annular member surrounding said motor cylinders; a pair of annular supports to rotatably carry said annular member on each side of said cylinders; a pair of pivoted arms articulated on each of said supports at substantially opposed points thereof with respect to the geometrical axis of said annular member, said arms being equal in length and disposed in substantially parallel and opposed relation; means to displace said supports in unison to vary the eccentricity of said annular member with respect to said first rotatable shaft; and distributing means for said motor cylinders, said distributing means receiving liquid under pressure from said hydraulic pump means.

3. In a hydraulic transmission gear as claimed in claim 2, said means to displace said supports being in the form of a spring-loaded hydraulic cylinder receiving liquid under pressure from said hydraulic pump means.

LOUIS GENETY.

REFERENCES CITED

The following references are of record in the file of this patent:

UNITED STATES PATENTS

| Number | Name | Date |
| --- | --- | --- |
| 2,099,630 | Schneider | Nov. 16, 1937 |
| 2,211,402 | Benedek | Aug. 13, 1940 |
| 2,220,636 | Bischof | Nov. 5, 1940 |
| 2,419,059 | De Villiers | Apr. 15, 1947 |